United States Patent
Chen et al.

(10) Patent No.: US 8,285,071 B2
(45) Date of Patent: Oct. 9, 2012

(54) CONTENT-ADAPTIVE CONTRAST IMPROVING METHOD AND APPARATUS FOR DIGITAL IMAGE

(75) Inventors: Shing-Chia Chen, Sinshih Township, Tainan County (TW); Ling-Shiou Huang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1429 days.

(21) Appl. No.: 11/852,776

(22) Filed: Sep. 10, 2007

(65) Prior Publication Data

US 2009/0067713 A1    Mar. 12, 2009

(51) Int. Cl.
*G06K 9/40* (2006.01)
*G06T 5/00* (2006.01)
(52) U.S. Cl. .................. 382/274; 382/168; 358/3.27
(58) Field of Classification Search .......... 382/168, 382/270, 274; 358/3.27; 348/678
See application file for complete search history.

(56) References Cited

U.S. PATENT DOCUMENTS

| | | | |
|---|---|---|---|
| 6,735,330 B1 * | 5/2004 | Van Metter et al. | 382/132 |
| 7,034,843 B2 * | 4/2006 | Nair et al. | 345/589 |
| 7,424,148 B2 * | 9/2008 | Goh | 382/169 |
| 7,573,533 B2 * | 8/2009 | Moldvai | 348/678 |
| 7,684,639 B2 * | 3/2010 | Zhao et al. | 382/274 |
| 7,768,496 B2 * | 8/2010 | Daly | 345/102 |
| 2006/0139270 A1 * | 6/2006 | Hong et al. | 345/87 |

* cited by examiner

*Primary Examiner* — Jason M Repko
*Assistant Examiner* — Patrick Edwards
(74) *Attorney, Agent, or Firm* — Stout, Uxa, Buyan & Mullins, LLP

(57) ABSTRACT

The present invention is directed to a digital image content-adaptive contrast improving method. The method includes forming a piecewise linear tone remapping function for a digital image according to the histogram thereof. The piecewise linear tone remapping function is formed by repeatedly performing a first and a second step. The first step determines a starting linear tone mapping function for a specific range of luminance values. The second step generates a new tone mapping function for the specific range of luminance values based on the starting linear tone mapping function and the histogram. An apparatus for implementing the method is also provided.

14 Claims, 4 Drawing Sheets

CONTENT-ADAPTIVE CONTRAST IMPROVING METHOD AND APPARATUS FOR DIGITAL IMAGE

BACKGROUND OF THE INVENTION

1. Field of the Invention

The present invention relates to digital image processing, and more particularly to a method and apparatus for improving the contrast of a digital image by a content-adaptive tone mapping function.

2. Description of the Prior Art

Digital image tone mapping is a function typically supported in the video processing unit of a digital image rendering device, such as a display device or a printer. The tone mapping function converts luminance code values of an input image from a predetermined range defined by the bit resolution of the input image to another desired range associated with the rendering device. The input image may be either a monochrome image or a color image. For the monochrome case, the gray levels of pixels are themselves used as the luminance components. For the color case, each pixel of the input image typically contains three or four components to define a color. In RGB color space, for example, these primary colors are red, green and blue, and the luminance component of each pixel can be obtained by a weighted summing of the red, green, and blue components of the pixel data.

The tone mapping function may be static or adaptive A static tone mapping function is defined by an invariant transfer function for all input images. An adaptive tone mapping function, on the other hand, may be dynamically adjusted according to desirable characteristics of the input image. Contrast improvement is usually taken into account when attempting to generate a rendered image that looks right with respect to the original scene. Due to the wide range of distributing status of pixels in different images, it is typically difficult to use a single static tone mapping function to fit all kind of images for contrast improvement purpose.

As a result, there exists a substantial need for a method and apparatus involving an adaptive tone mapping function capable of improving image contrast, and preferably simple, low cost and easy to implement.

SUMMARY OF THE INVENTION

The present invention aims to provide a method and apparatus to improve the contrast of a digital image by a content-adaptive tone mapping function.

In a preferred embodiment, the present invention provides a digital image content-adaptive contrast improving method. The method includes the steps of generating a histogram recording luminance distribution of a digital image; sectionalizing pixels of the digital image into a plurality of pixel groups, the pixel groups respectively covering pixels lying in exclusive luminance ranges; forming a piecewise linear tone remapping function for the digital image according to the histogram, the piecewise linear tone remapping function being represented by a plurality of line segments consecutively connected to each other one by one, each of the line segments representing a local linear remapping function for one of the pixel groups; and applying the piecewise linear tone remapping function to the digital image.

The piecewise linear tone remapping function may be formed by repeatedly performing a first step and a second step. The first step determines a starting linear tone mapping function for a specific range of luminance values lying between a first code value and a second code value greater than the first code value, the specific range of luminance values covering luminance values of at least two pixel groups. The second step generate a new tone mapping function for the specific range of luminance values based on the starting linear tone mapping function and a distributing status of pixels lying in the specific range, the distributing status being derived from the histogram.

The present invention also provides an apparatus for implementing the digital image content-adaptive contrast improving method. The apparatus includes a histogram generating unit, an image sectionalizing unit, a remapping function constructing unit and an image remapping unit.

DETAILED DESCRIPTION OF THE INVENTION

Reference will now be made in detail to the embodiments of the present invention, examples of which are illustrated in the accompanying drawings, wherein similar reference notations refer to similar notions or elements throughout. The embodiments are described below to explain the present invention by referring to the figures.

Figure 1:
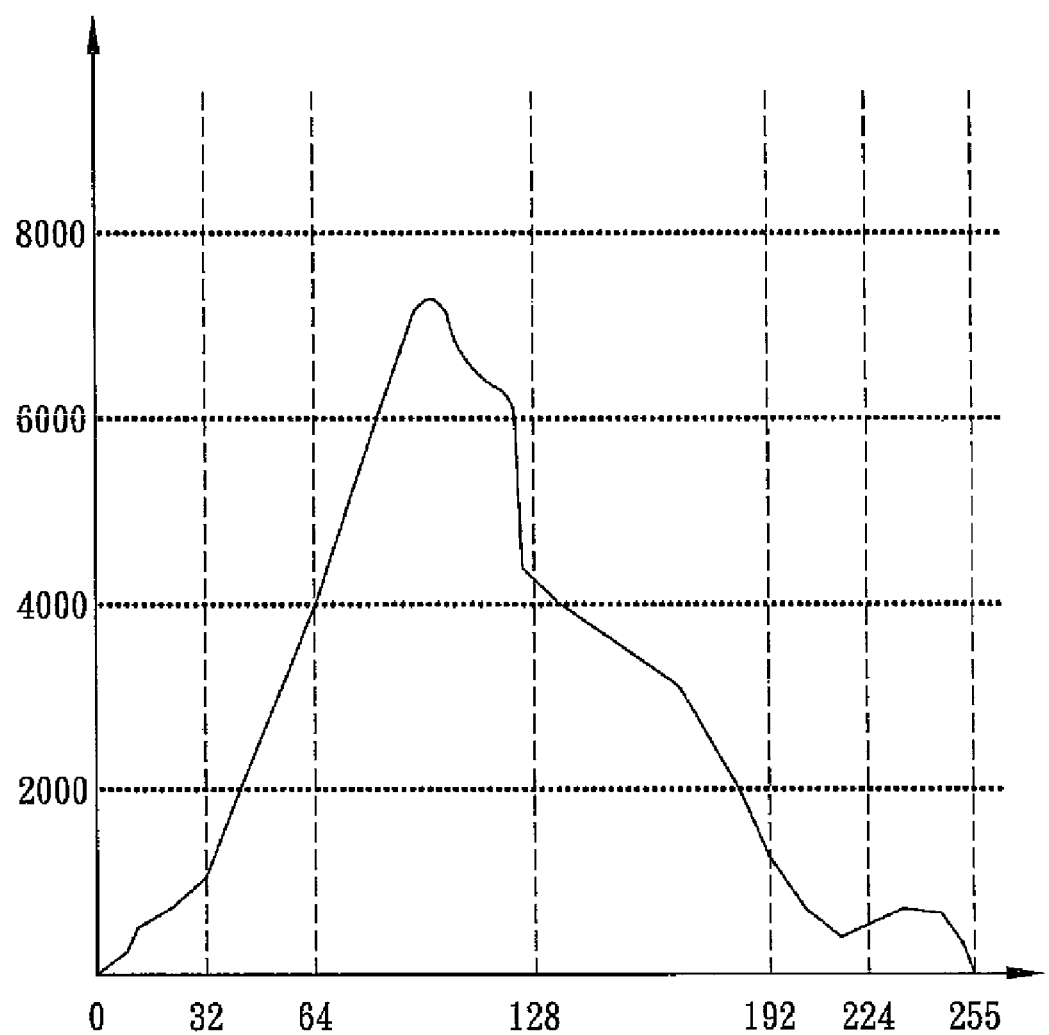
FIG. 1 shows a graphic diagram representing the histogram generated for a digital image in accordance with the present invention.

FIG. 1 shows a graphic diagram representing the histogram generated for a digital image in accordance with the present invention. The horizontal axis of the diagram represents possible luminance code values of pixels in the digital image. As can be noted in FIG. 1, the luminance components of pixels in the digital image under processing are encoded with 8 bits, which will produce luminance code values ranging from 0 to 255, as shown in the horizontal axis. On the other hand, the vertical axis of the diagram stands for counts of pixels. To simplify the drawing, distribution of luminance values are shown in the histogram as a profile depicted by a continuous curve which is formed by, as should be understood by those skilled in the art, connecting the top ends of all the vertical bars respectively representing counts of pixels with specific luminance values. In accordance with a preferred embodiment and as illustrated by the vertical dot lines shown in FIG. 1, pixels of the digital image are sectionalized or divided into six groups which respectively cover pixels lying in exclusive luminance ranges. In other words, luminance value of any pixel in a group is different from luminance value of any pixel in any other group. Particularly, in this embodiment, the six pixel groups include a first group containing pixels with luminance values ranging from 0 to 31, a second group containing pixels with luminance values ranging from 32 to 63, a third group containing pixels with luminance values ranging from 64 to 128, a fourth group containing pixels with luminance values ranging from 129 to 191, a fifth group containing pixels with luminance values ranging from 192 to 224, as well as a sixth group containing pixels with luminance values ranging from 225 to 255. It should be appreciated that there are many other ways to sectionalize pixels of the digital image without departing from the scope of the present invention. Furthermore, number of bits representing a code value may be a number other than 8. Number of pixel groups may be the same or different for digital images with different bit resolutions. For example, a digital image with lower (respectively higher) bit resolution may be divided into less (respectively more) groups.

FIG. 2A to FIG. 2F collectively illustrate the intermediate outcomes generated from a method for stepwise forming a tone remapping function $T_{NN}(x)$ of a digital image, such as the one with the histogram shown in FIG. 1, in accordance with an embodiment of the present invention. In the following description as well as the context of the associated claims, unless specified explicitly, values "lying between" a first value and a second value (which is larger than the first value) may be generally interpreted as all values greater than or equal to the first value and less than the second value.

Figure 2A:
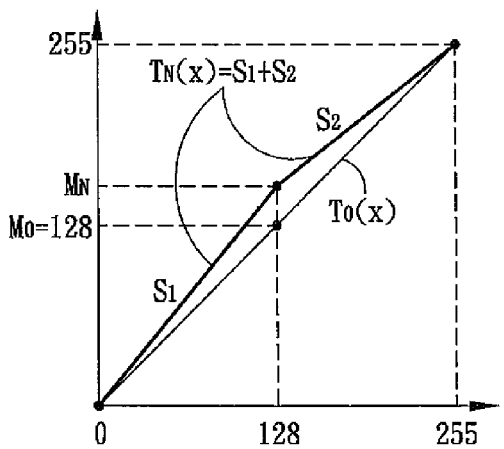
FIG. 2A to FIG. 2F collectively illustrate the intermediate outcomes generated from a method for stepwise forming a tone remapping function of a digital image in accordance with an embodiment of the present invention.

Please refer to FIG. 2A and FIG. 1 for the following description, in which FIG. 2A shows a line representing a default linear tone mapping function $T_O(x)$ with a unity slope (i.e., 1) and two line segments $S_1$ and $S_2$ collectively representing a new tone mapping function $T_N(x)$. With the unity slope, the mapping function $T_O(x)$ transfers any code value into itself, for example, 0 will be transferred in into 0 and 128 will be transferred into 128. In other embodiment, depending on the range of output luminance values, the default linear tone mapping function $T_O(x)$ may have a slope other than 1. The operation illustrated by FIG. 2A aims to generate a new tone mapping function $T_N(x)$ for luminance code values ranging from 0 to 255 which cover all possible code values in current bit resolution (i.e., 8) of the digital image under processing. Firstly, the default linear tone mapping function $T_O(x)$ is selected as the starting tone mapping function. Then, it determines a newly remapped value $M_N$ (i.e., $T_N(128)$) of a specific code value (which is 128 in this case, should preferably be a value around 128, and can be any value between 0 and 255 in general) substantially lying in the middle of code values 0 and 255 based on the starting tone mapping function $T_O(x)$ and the histogram of the digital image. From the luminance distribution shown in FIG. 1, since the total count of pixels with luminance values lying between 0 and 128 (the specific code value) is apparently more than the count of pixels with luminance values lying between 128 and 255 (including 255), the newly remapped value $M_N$ for the specific code value 128 is determined as a number greater than the originally mapped value $M_O$ (i.e., $T_O(128)$ which equals 128 in this case because $T_O(x)$ has a unity slope). Otherwise, when the count of pixels with luminance values lying between 0 and 128 (the specific code value) is less than the count of pixels with luminance values lying between 128 and 255 (including 255), then the newly remapped value $M_N$ will be selected as a number less than the originally mapped value $M_O$. When the difference between counts of pixels lying in the two halves of ranges (0-128 and 128-255) gets larger, then the newly remapped value $M_N$ for the specific code value 128 may be selected farther from the originally mapped value.

After the newly remapped value $M_N$ for the specific code value 128 is determined. The new tone mapping function $T_N(x)$ may then be defined as the two local mapping functions represented respectively by the two line segments $S_1$ and $S_2$, in which connects between end points (0,0) and (128,$M_N$), while $S_2$ connects between end points (128,$M_N$) and (255, 255). In a more general case, note that (0,0) and (255,255) may be in fact respectively (0,$T_O(0)$) and (255,$T_O(255)$).

In a preferred embodiment, the newly remapped value $M_N$ for the specific code value 128 is determined such that the difference between the newly remapped value $M_N$ and the originally mapped value $M_O$ is substantially proportional to the ratio of counts of pixels lying in the two halves of ranges (0-128 and 128-255). In another embodiments, the newly remapped value $M_N$ may be determined according to other distributing status or statistic quantity, as long as derivable from the histogram, of pixels lying in the two halves of ranges, such as the average luminance value thereof, the average luminance value of part of pixels, the median thereof, etc.

In another embodiment, an upper limit and a lower limit are assigned for the specific code value 128 such that if the new remapped value $M_N$ determined above is larger than the upper limit (respectively less than the lower limit), then the newly remapped value $M_N$ is set to the upper limit (respectively set to the lower limit). The upper limit (or the lower limit) may be selected such that the difference between the newly remapped value $M_N$ and the originally mapped value $M_O$ equals to the originally mapped value $M_O$ multiplied by a predetermined factor. Alternatively, the upper limit and/or the lower limit may be selected empirically.

Figure 2D:
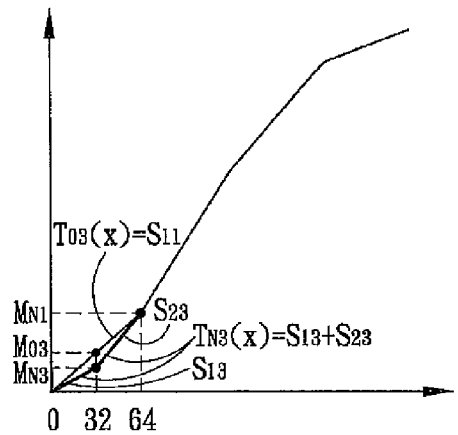
Figure 2B:
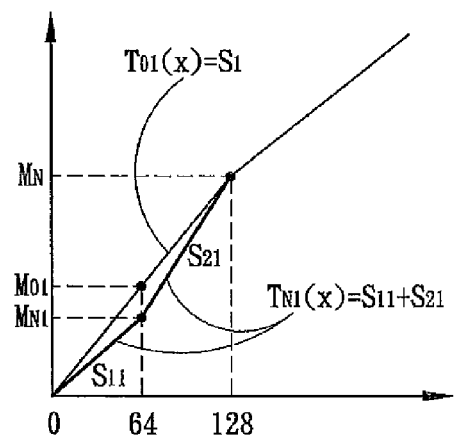

Please refer to FIG. 2B and FIG. 1 now, in which FIG. 2B graphically illustrates the process for determining the new tone mapping function $T_{N1}(x)$ for pixels with luminance values lying in the range between 0 and 128. For a systematic understanding of the present invention, similar notations with different subscripts are used in FIG. 2B to designate the similar concepts which, however, may refer to different targets in FIG. 2A and FIG. 2B.

The starting tone mapping function $T_{O1}(x)$ is selected as part of the new tone mapping function $T_N(x)$ generated in the description of FIG. 2A (specifically, the local mapping function represented by the line segment $S_1$ in FIG. 2A). The newly remapped value $M_{N1}$ of a specific code value (which is 64 in this case, should be a value around 64 preferably) substantially lying in the middle of code values 0 and 128 is then determined according to the histogram and the starting tone mapping function $T_{O1}(x)$. The remapped value of the specific code value 64 through $T_{O1}(x)$ is now designated as $M_{O1}$. The logic similar to that described in FIG. 2A is employed for determining the newly remapped value $M_{N1}$ of the specific code value 64. Specifically, the remapped value of 64 is increased or decreased (as shown in FIG. 2B, from $M_{O1}$ to $M_{N1}$) based on the luminance distribution of pixels with luminance values lying between 0 and 64. After the newly remapped value $M_{N1}$ for the specific code value 64 is determined. The new tone mapping function $T_{N1}(x)$ may then be defined as the two local mapping functions represented respectively by the line segments $S_{11}$ connecting between end points (0,0) and (64,$M_{N1}$) as well as $S_{21}$ connecting between end points (64,$M_{N1}$) and (128,$M_N$). Similarly, the newly remapped value $M_{N1}$ may be determined according to other distributing status or statistic quantity derivable from the histogram, such as the average luminance value thereof, the average luminance value of part of pixels, the median thereof, etc.

In another embodiment, an upper limit and a lower limit may be assigned for the specific code value 64 such that if the new remapped value $M_{N1}$ determined above is larger than the upper limit (respectively less than the lower limit), then the newly remapped value $M_{N1}$ is set to the upper limit (respectively set to the lower limit). The upper limit (or the lower limit) may be selected such that the difference between the newly remapped value $M_{N1}$ and the originally mapped value $M_{O1}$ equals to the originally mapped value $M_{O1}$ multiplied by a predetermined factor. Alternatively, the upper limit and/or the lower limit may be selected empirically.

Figure 2E:
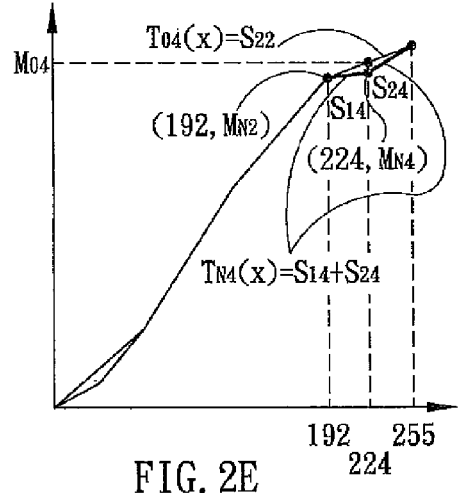
Figure 2C:
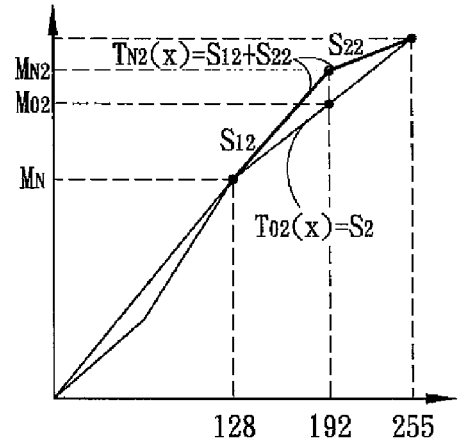

FIG. 2C illustrates the process for determining the new tone mapping function $T_{N2}(x)$ for pixels with luminance values lying between 128 and 255 (including 255), starting from the linear mapping function $T_{O2}(x)$ which is the local mapping function represented by the line segment $S_2$ determined in FIG. 2A. The new tone mapping function $T_{N2}(x)$ may then be defined as the two local mapping functions represented respectively by the line segments $S_{12}$ (connecting between end points $(128,M_N)$ and $(192,M_{N2})$) and $S_{22}$ (connecting between end points $(192,M_{N2})$ and $(255,255)$), in which $M_{N2}$ is the remapped value of 192 through $T_{N2}(x)$ and $M_{N2}$ is determined in the manner similar to that described in FIG. 2A and FIG. 2B.

FIG. 2D illustrates the process for determining the new tone mapping function $T_{N3}(x)$ for pixels with luminance values lying between 0 and 63, starting from the linear mapping function $T_{O3}(x)$ which is the local mapping function represented by the line segment $S_{11}$ determined in FIG. 2B. With a process similar to that shown in the description of FIG. 2A through FIG. 2C, the new tone mapping function $T_{N3}(x)$ may be defined as the two local mapping functions represented respectively by the line segments $S_{13}$ (connecting between end points $(0,0)$ and $(32,M_{N3})$) and $S_{23}$ (connecting between end points $(32,M_{N3})$ and $(64,M_{N1})$), in which $M_{N3}$ is a remapped value of 32 determined in the manner similar to that described in FIG. 2A through FIG. 2C.

FIG. 2E illustrates the process for determining the new tone mapping function $T_{N4}(x)$ for pixels with luminance values lying between 192 and 255 (including 255), starting from the linear mapping function $T_{O4}(x)$ which is the local mapping function represented by the line segment $S_{22}$ determined in FIG. 2C. With a process similar to that shown in the description of FIG. 2A through FIG. 2C, the new tone mapping function $T_{N4}(x)$ may be defined as the two local mapping functions represented respectively by the line segments $S_{14}$ (connecting between end points $(192,M_{N2})$ and $(224,M_{N4})$) and $S_{24}$ (connecting between end points $(224,M_{N4})$ and $(255, 255)$), in which $M_{N4}$ is a remapped value of 224 determined in the manner similar to that described in FIG. 2A through FIG. 2D.

Figure 2F:
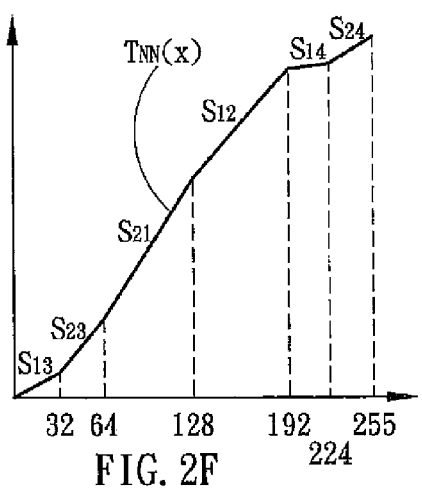

FIG. 2F shows the piecewise linear tone mapping function $T_{NN}(x)$ which is defined by the six local linear remapping functions represented respectively by the line segments $S_{13}$, $S_{23}$, $S_{21}$, $S_{12}$, $S_{14}$ and $S_{24}$. Note that each of the line segments represents a local linear remapping function for one of the pixel groups defined in FIG. 1.

Figure 3A:
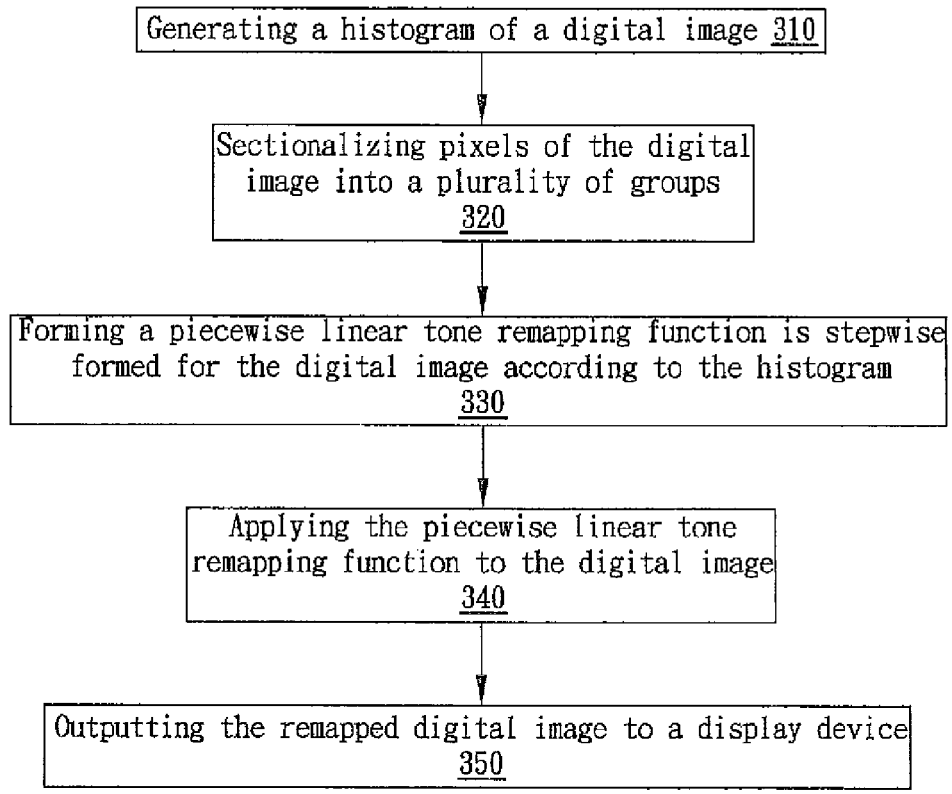
FIG. 3A summarizes the content-adaptive image contrast improving method by remapping luminance of a digital image in accordance with an embodiment of the present invention.

FIG. 3A summarizes the content-adaptive image contrast improving method by remapping luminance of a digital image in accordance with an embodiment of the present invention. The digital image under processing may be input from a suitable location such as the system memory. A histogram of the digital image is generated in step 310. The histogram records luminance distribution of pixels in the digital image. In step 320, pixels of the digital image are sectionalized into a plurality of groups. Each group contains pixels lying in exclusive luminance ranges such as in the manner illustrated in FIG. 1. A piecewise linear tone remapping function is stepwise formed for the digital image in step 330 according to the histogram generated in step 310. The piecewise linear tone remapping function is represented by a plurality of line segments consecutively connected to each other one by one, each of the line segments representing a local linear remapping function for one of the pixel groups defined in step 320. The piecewise linear tone remapping function is then applied to the digital image in step 340. In step 350, the remapped digital image then may be output to a display device such as an LCD panel.

Figure 3B:
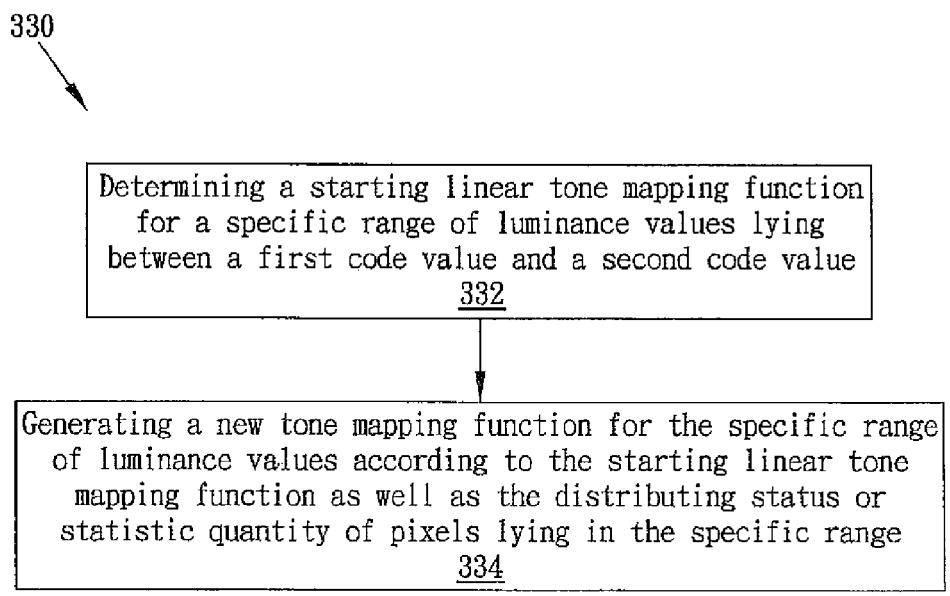
FIG. 3B further details the tone mapping function forming step of the method illustrated in FIG. 3A.

Step 330 is further detailed in FIG. 3B which includes step 332 and step 334. Step 332 determines a starting linear tone mapping function for a specific range of luminance values lying between a first code value C1 and a second code value C2 greater than the first code value C1, the specific range of luminance values covering luminance values of at least two aforementioned pixel groups. In the case illustrated in FIG. 2A through FIG. 2E, for example, the specific ranges are respectively 0 to 255, 0 to 128, 128 to 255, 0 to 64 and 192 to 255 and the starting linear tone mapping functions are respectively represented by the lines segments connecting end points $(0,0)$-$(255,255)$, $(0,0)$-$(128,M_N)$, $(128,M_N)$-$(255,255)$, $(0,0)$-$(64,M_{N1})$ and $(192,M_{N2})$-$(255,255)$. In step 334, a new tone mapping function is generated for the specific range of luminance values according to the starting linear tone mapping function determined in step 332 as well as the distributing status or statistic quantity of pixels lying in the specific range. The generated new tone mapping functions corresponding to the examples illustrated in FIG. 2A through FIG. 2E may be respectively represented by the line segment pairs $(S_1,S_2)$, $(S_{11},S_{21})$, $(S_{12},S_{22})$, $(S_{13},S_{23})$ and $(S_{14},S_{24})$. The distributing status or statistic quantity of pixels may be derived from the histogram generated in step 310, such as in the manner illustrated in the description of FIG. 2A through FIG. 2E. Repeatedly executing steps 332 and 334 for different luminance range and different starting mapping function will finally form, for example, a piecewise linear tone mapping function shown in FIG. 2F.

Figure 4:
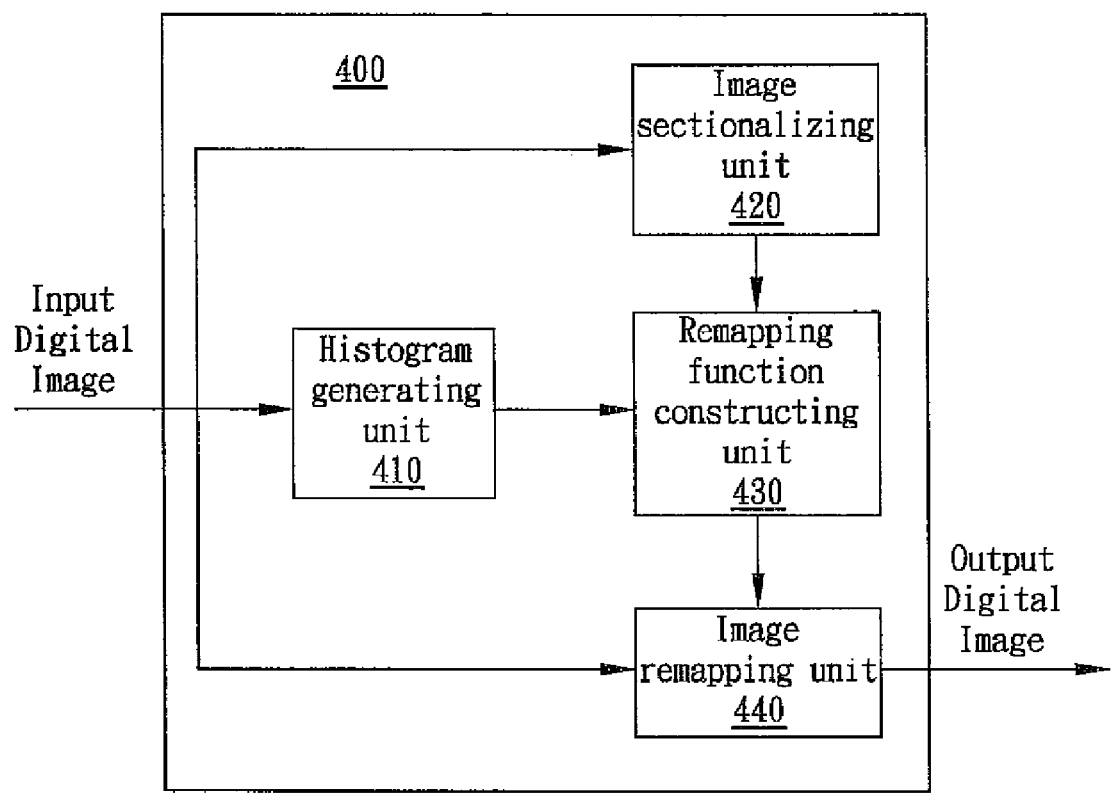
FIG. 4 shows a block diagram of a content-adaptive contrast improving apparatus 400 in accordance with an embodiment of the present invention.

The present invention also includes an apparatus implementing the method disclosed above. FIG. 4 shows a block diagram of a content-adaptive contrast improving apparatus 400 in accordance with an embodiment of the present invention. In general, the content-adaptive contrast improving apparatus 400 may be a portion of a digital image processing unit in an image rendering system, such as a display device or a printer. The apparatus 400 includes a histogram generating unit 410, an image sectionalizing unit 420, a remapping function constructing unit 430 and an image remapping unit 440. Please refer to FIG. 4 as well as FIG. 3A and FIG. 3B for the following description.

The histogram generating unit 410 may perform step 310 of FIG. 3A to generate a histogram of an input digital image. As described above, the histogram records luminance distribution of pixels in the digital image. The image sectionalizing unit 420 may divide pixels of the digital image into a plurality of groups, as described in step 320, based on the bit resolution of the digital image. The groups of pixels form the basis for the piecewise linear tone mapping function to be constructed in the remapping function constructing unit 430. Based on the histogram output from the histogram generating unit 410 and the way of pixels grouped in the image sectionalizing unit 420, the remapping function constructing unit 430 may execute the aforementioned step 330 to form a piecewise linear tone mapping function. The piecewise linear tone mapping function may be formed through repeatedly or iteratively executing the aforementioned step 332 and step 334 for different ranges of luminance values and different starting linear tone mapping functions. In each repeat of step 332 and step 334, for example, a new local tone mapping function is formed for corresponding range of luminance values. Each new local tone mapping function is typically represented by a pair of connecting line segments as illustrated in the description of step 334 and the examples shown in FIG. 2A through FIG. 2E. The image remapping unit 440 may then convert the input digital image into a remapped output image through the piecewise linear tone mapping function formed in the remapping function constructing unit 430.

In a preferred embodiment, all the units described in FIG. 4 are implemented as logic elements in an ASIC (Application Specific Integrated Circuit). In other embodiments according to the present invention, such units may also be implemented as software or hardware modules in a DSP (Digital Signal Processing) based system or a microprocessor based system. In addition, the system memory mentioned above is typically composed of DRAM (dynamic random access memory), but may be any other feasible volatile or non-volatile memory.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A digital image content-adaptive contrast improving method, comprising the steps of:
   generating a histogram recording luminance distribution of a digital image;
   sectionalizing pixels of said digital image into a plurality of pixel groups, said pixel groups respectively covering pixels lying in exclusive luminance ranges;
   forming a piecewise linear tone remapping function for said digital image according to said histogram, said piecewise linear tone remapping function being represented by a plurality of line segments consecutively connected to each other one by one, each of said line segments representing a local linear remapping function for one of said pixel groups, comprising:
   a first step for determining a starting linear tone mapping function for a specific range of luminance values, which is between a first code value C1 and a second code value C2 greater than said first code value C1, said specific range of luminance values covering luminance values of at least two said pixel groups; and
   applying said piecewise linear tone remapping function to said digital image;
   wherein, said piecewise linear tone remapping function is formed by repeatedly performing said first step and a second step, wherein said specific range and said starting linear tone mapping function are different in each instance of said first and second steps.

2. The method of claim 1, wherein said second step comprises generating a new tone mapping function for said specific range of luminance values based on said starting linear tone mapping function and a distributing status of pixels in said specific range, and said distributing status is derived from said histogram.

3. The method of claim 2, wherein, in the first occurrence of said first step, said specific range of luminance values covers all possible code values in current bit resolution of said digital image and said starting linear tone mapping function is a linear tone mapping function with a unity slope.

4. The method of claim 2, wherein said starting linear tone mapping function is part of said new tone mapping function generated in previous occurrence of said second step.

5. The method of claim 2, wherein said new tone mapping function remaps a specific code value Cm, which is substantially in the middle of said first code value C1 and said second code value C2, to a new mapped value Mn, wherein said specific code value Cm is mapped to an originally mapped value $M_O$ through said starting linear tone mapping function, and according to said histogram, if number of pixels with luminance values, which is between said first code value C1 and specific code value Cm, is larger than a number of pixels with luminance values, which is between said specific code value Cm and said second code value C2, then said new mapped value Mn is greater than said originally mapped value $M_O$; otherwise said new mapped value Mn is less than or equal to said originally mapped value $M_O$.

6. The method of claim 5, wherein said new mapped value Mn is between a predetermined upper limit code value and a predetermined lower limit code value which are special code values assigned according to said specific code value Cm.

7. The method of claim 5, wherein said new tone mapping function is represented by two line segments connecting end points (C1,M1),(Cm,Mn) and (C2,M2), wherein said first code value C1 and said second code value C2 are respectively remapped to code values M1 and M2 through said starting linear tone mapping function.

8. A digital image content-adaptive contrast improving apparatus, comprising:
   a histogram generating unit configured to generate a histogram recording luminance distribution of a digital image;
   an image sectionalizing unit configured to sectionalize pixels of said digital image into a plurality of pixel groups, said pixel groups respectively covering pixels lying in exclusive luminance ranges;
   a remapping function constructing unit configured to form a piecewise linear tone remapping function for said digital image according to said histogram, said piecewise linear tone remapping function being represented by a plurality of line segments consecutively connected to each other one by one, each of said line segments representing a local linear remapping function for one of said pixel groups, wherein said remapping function constructing circuit is configured to execute a first step for determining a starting linear tone mapping function for a specific range of luminance values, which is between a first code value C1 and a second code value C2 greater than said first code value C1, said specific range of luminance values covering luminance values of at least two said pixel groups; and
   an image remapping unit configured to apply said piecewise linear tone remapping function to said digital image;
   said remapping function constructing circuit being configured to form said piecewise linear tone remapping function by repeatedly performing said first step and a second step, wherein said specific range and said starting linear tone mapping function are different in each occurrence of said first and second steps.

9. The apparatus of claim 8, wherein said remapping function constructing unit is further configured to execute said second step for generating a new tone mapping function for said specific range of luminance values based on said starting linear tone mapping function and a distributing status of pixels in said specific range, and said distributing status is derived from said histogram.

10. The apparatus of claim 9, wherein, in the first occurrence of said first step, said specific range of luminance values covers all possible code values in current bit resolution of said digital image and said starting linear tone mapping function is a linear tone mapping function with a unity slope.

11. The apparatus of claim 9, wherein said starting linear tone mapping function is part of said new tone mapping function generated in a previous occurrence of said second step.

12. The apparatus of claim 9, wherein said new tone mapping function remaps a specific code value Cm, which is substantially in the middle of said first code value C1 and said second code value C2 to a new mapped value Mn, wherein said specific code value Cm is mapped to an originally mapped value $M_O$ through said starting linear tone mapping function, and according to said histogram, if a number of pixels with luminance values, which is between said first code value C1 and specific code value Cm, is larger than a number of pixels with luminance values, which is between said specific code value Cm and said second code value C2, then said new mapped value Mn is greater than said originally mapped value $M_O$; otherwise said new mapped value Mn is less than or equal to said originally mapped value $M_O$.

13. The apparatus of claim 12, wherein said new mapped value Mn is between a predetermined upper limit code value and a predetermined lower limit code value which are special code values assigned according to said specific code value Cm.

14. The apparatus of claim 12, wherein said new tone mapping function is represented by two line segments connecting end points (C1,M1), (Cm,Mn) and (C2,M2), wherein said first code value C1 and said second code value C2 are respectively remapped to code values M1 and M2 through said starting linear tone mapping function.

* * * * *